S. E. MARTZ.
ANTISKIDDING DEVICE.
APPLICATION FILED FEB. 27, 1915.

1,190,314.

Patented July 11, 1916.
2 SHEETS—SHEET 1.

Inventor
S. E. Martz.

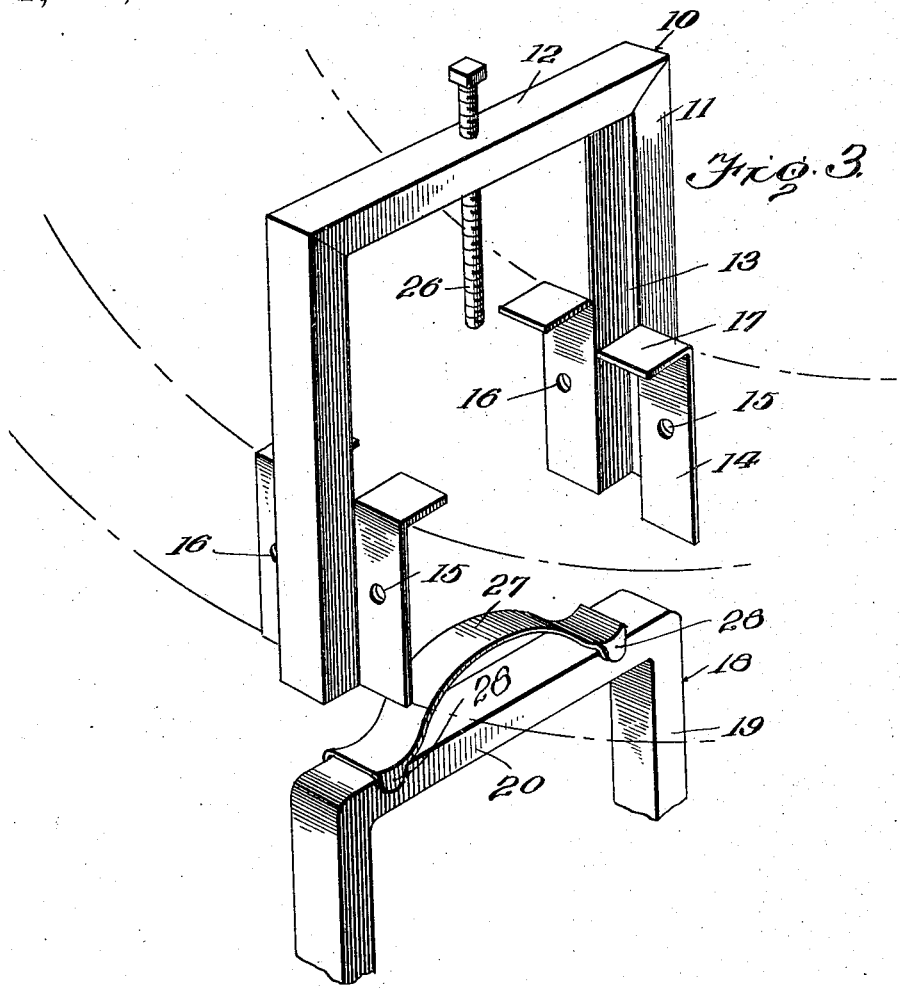

UNITED STATES PATENT OFFICE.

SILAS E. MARTZ, OF PLYMOUTH, PENNSYLVANIA.

ANTISKIDDING DEVICE.

1,190,314. Specification of Letters Patent. Patented July 11, 1916.

Application filed February 27, 1915. Serial No. 11,100.

*To all whom it may concern:*

Be it known that I, SILAS E. MARTZ, a citizen of the United States, residing at Plymouth, in the county of Luzerne and State of Pennsylvania, have invented certain new and useful Improvements in Antiskidding Devices, of which the following is a specification.

This invention contemplates an improved anti-skidding device for vehicle wheels, being especially designed for use in connection with the wheels of motor vehicles, and has as its primary object to provide an article of this character which will prove thoroughly efficient in use, and which may be readily connected to any conventional type of wheel without the necessity of structural change therein.

The invention has as a further object to provide an anti-skidding device employing a spur or road engaging member which will normally be resiliently urged radially of the wheel to engage the road and which will be adapted for movement radially of the wheel against the tension of said yieldable means under the weight of the load of the vehicle, to thus be brought into effectual engagement with the road.

The invention has as a further object to provide an improved form of bracket for the road engaging member which will be of simple construction and which will be adapted to efficiently support the road engaging member in operative position upon the wheel.

Figure 1:
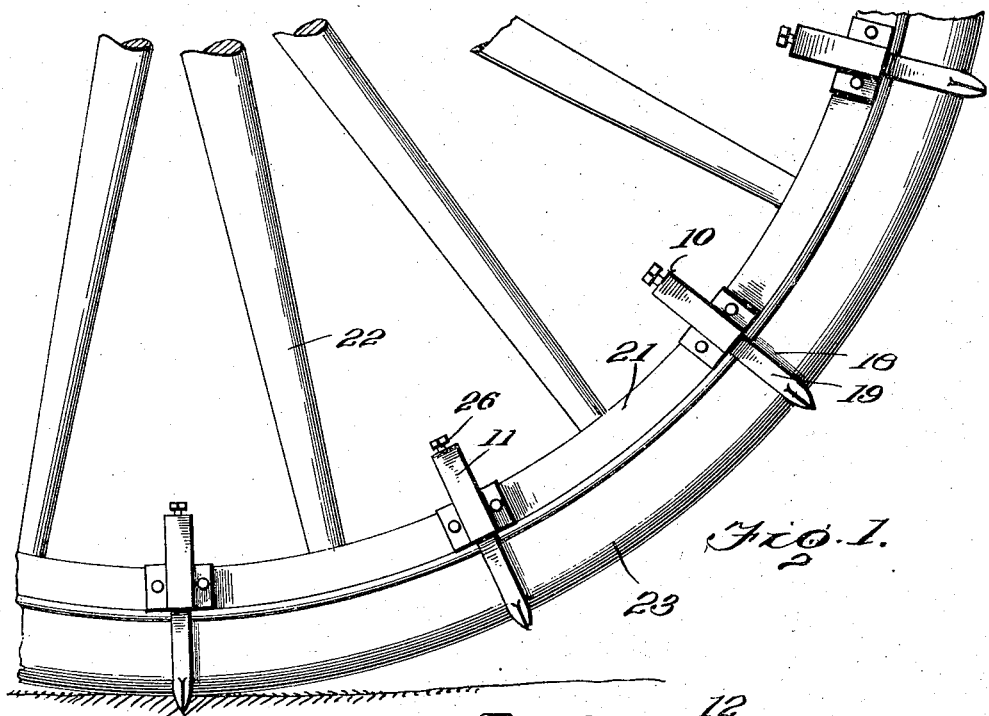
Figure 2:
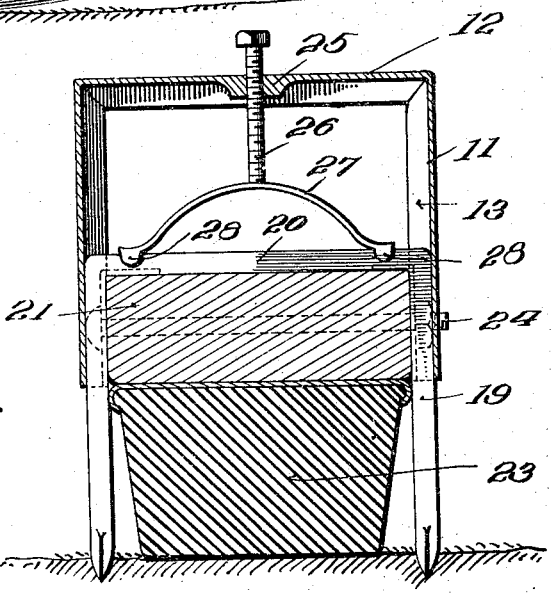

Other and incidental objects will appear as the description proceeds and in the drawings, wherein I have illustrated the preferred embodiment of my invention, and wherein similar reference characters designate corresponding parts throughout the several views, Figure 1 is a fragmentary side elevation disclosing the use of my improved anti-skidding device upon a vehicle wheel of conventional construction, Fig. 2 is a transverse sectional view more particularly illustrating the mounting of the road engaging member, Fig. 3 is a fragmentary perspective view showing the device detached and particularly illustrating the construction of the supporting bracket for the road engaging member.

In the preferred embodiment of my invention, I employ a substantially U-shaped supporting bracket 10 having laterally directed side portions or arms 11 arranged substantially parallel to each other, the side portions being joined by a connecting portion 12. As best illustrated in Fig. 3 of the drawings, the bracket 10 is provided with a continuous channel, as shown at 13.

The supporting bracket 10 is preferably formed from sheet metal although any other suitable material may be employed and is provided, at the free extremities of the arms 13 with laterally directed and oppositely disposed flanges 14 integrally formed on the free edges of the side walls of the said arms, the said flanges of each arm extending in opposite directions and being arranged at substantially right angles to the side walls thereof. Formed in corresponding flanges of the arms 11 are pairs of alined openings 15 and 16 respectively.

Integrally formed on the inner terminals of the flanges 14 are laterally directed lugs 17 which extend inwardly between the arms and are arranged at substantially right angles to the flanges 14.

Arranged to coöperate with the supporting bracket 10 is a substantially U-shaped road engaging member 18 which is preferably integrally formed of suitable metal and the laterally directed arms 19 of which provide spurs adapted to engage the road, the free extremities of said arms being preferably sharpened or pointed. The arms 19 are joined by a substantially straight connecting portion 20 which extends at substantially right angles to the arms.

The road engaging member 18 is adapted to embrace the felly 21 of a wheel conventionally shown at 22 in the drawings, with the connecting portion 20 of the said member normally seating against the inner face of the felly as best shown in Fig. 2, and with the arms 19 extending radially of the wheel upon each side of the tire conventionally shown at 23. Preferably, the outer free ends of the arms 19 normally project a slight distance beyond the periphery of the tire to effectually engage the road.

As best shown in Fig. 2 of the drawings, the supporting bracket 10 is also adapted to embrace the felly 21 with the flanges 14 seating against the opposite side edges of the felly and with the lugs 17 bearing over and seating upon the inner face thereof. The arms 11 are thus arranged to project inwardly and radially toward the hub of the wheel, as shown in Fig. 1 of the drawings and are adapted to slidably receive the arms 19 of the road engaging member 18 within the channel 13, the road engaging member being thus mounted for radial movement upon the wheel. Detachably connecting the supporting bracket 10 with the felly are bolts 24 or other suitable fastening devices, which are arranged to extend through the felly and through the pairs of alined openings 15 and 16, respectively.

The connecting portion 12 of the supporting bracket 10 is provided, substantially midway its ends, with an internally screw threaded bore, which is surrounded by a boss 25, and adjustably mounted in said bore is a set screw 26. Bearing between the inner terminal of the set screw 26 and the connecting portion 20 of the road engaging member 19 is a bowed spring 27, the terminals of which are provided with oppositely disposed and laterally directed lugs 28 embracing the opposite side edges of the said connecting portion.

Upon reference to Fig. 2 of the drawings, it will be seen that when the tire 23 is depressed under the weight of a load, the road engaging member will be brought into effectual engagement with the road and will tend to move radially of the felly within the channels 13 of the supporting bracket 10 against the tension of the spring 27. The spring 27 thus provides a yieldable cushioning element for the road engaging member normally urging the said member radially of the wheel to engage the road, the tension of the said spring being regulated through the medium of the set screw 26.

It will thus be seen that I provide a very simple and efficient construction for the purpose set forth, and in use, one of my improved devices will be preferably arranged midway between adjacent spokes of the wheel as shown in Fig. 1 of the drawing.

Having thus described my invention, what I claim and desire to secure by Letters Patent is:—

1. A device of the character described including a supporting bracket provided with spaced arms, laterally extending flanges formed on said arms, stop lugs carried by said flanges, a road engaging member slidably mounted upon said arms, the said member and the bracket embracing a wheel felly with the member projecting radially upon opposite sides of the felly and with said flanges seating against opposite edges of the felly with the stop lugs engaging the inner face of the felly, means connecting said flanges to the felly, a spring carried by the member, and means adjustable upon the bracket and engaging said spring for regulating the tension thereof.

2. The combination with a wheel felly, of a supporting bracket provided with spaced arms embracing the felly, a laterally extending flange formed on each of said arms and seating against the adjacent side edge of the felly, a stop lug carried by each of said flanges and engaging the inner face of the felly, means connecting the said flanges with the felly, a road engaging member adapted to embrace the felly and slidably mounted upon said arms, the said member being arranged to project radially of the felly, and yieldable means engaging said member for normally urging it to position projected beyond the periphery of a tire carried by the felly.

3. The combination with a wheel felly, of a substantially U-shaped supporting bracket having spaced arms joined by a connecting portion, the arms embracing the felly and having channels formed therein, laterally directed and oppositely disposed flanges formed on the side walls of said arms at the free extremities thereof and seating against opposite side edges of the felly, laterally directed stop lugs formed on the inner extremities of said flanges and extending inwardly between the arms, the said lugs seating against the inner face of the felly, bolts extending through said flanges and the felly and detachably connecting the bracket with the felly, a substantially U-shaped road engaging member having spaced arms joined by a connecting portion, the said arms being slidably mounted in said channels with the connecting portion normally resting against the inner face of the felly, a bowed spring mounted upon the connecting portion of said member, and a set screw adjustable upon the connecting portion of said bracket and engaging said spring.

4. The combination with a wheel felly, of a supporting bracket having arms joined by a connecting portion and secured at their free extremities to opposite side faces of the felly to project laterally therefrom, a road engaging member slidably mounted upon the said arms and provided with arms interposed between the arms of the supporting bracket and the side faces of the felly, and yieldable means interposed between the connecting portion of the said bracket and the road engaging member for urging the member radially of the felly.

In testimony whereof I affix my signature in presence of two witnesses.

SILAS E. MARTZ. [L. S.]

Witnesses:
 JNO. D. MANGAN,
 WM. P. LARGHNEY.